Dec. 3, 1968     C. O. PERRY     3,413,752

BODY HAVING A SNAP-TYPE FASTENER

Original Filed April 20, 1964

INVENTOR.
CHARLES O. PERRY
BY Naylor & Neal
ATTORNEYS

3,413,752
Patented Dec. 3, 1968

1

3,413,752
BODY HAVING A SNAP-TYPE FASTENER
Charles O. Perry, 1225 Jones, San Francisco,
Calif. 94133
Continuation of application Ser. No. 360,924, Apr. 20,
1964. This application Nov. 14, 1967, Ser. No. 683,030
7 Claims. (Cl. 46—25)

ABSTRACT OF THE DISCLOSURE

A snap-type fastener in which two bodies can be attached together by identical connectors in each body. The connector in each body comprises a recess in the face of the body with a stem in the recess supporting a latch portion which projects beyond the face of the body.

---

This is a continuation of application Ser. No. 360,924, filed Apr. 20, 1964, now abandoned.

This invention relates to snap fasteners and the like and more particularly to snap fasteners for attaching two bodies together by simply pushing the bodies together.

In accordance with this invention there is provided a new snap fastener which has a wide variety of uses in attaching bodies together but which is particularly useful in the manufacture of children's toys. Thus, the snap fastener of this invention may be incorporated into the faces of toy building blocks and the like to permit the blocks to be attached together very easily.

The snap fastener of this invention has two halves which are incorporated into the two different bodies to be fastened, and the two halves are identical so that each of the two bodies can carry a plurality of fastener halves with each fastener half on one body useable with each of the fastener halves on the other body. Thus, considering the use of the fasteners on toy building blocks, each building block may have a fastener half on each of its six faces so that any two blocks can be attached together in thirty-six different ways. Additionally, the fastener halves project only very slightly from the bodies in which they are incorporated so that they do not interfere with the use of the bodies where a particular fastener half is unused in an assembly of fastened bodies.

The snap fasteners of this invention may be manufactured and incorporated into building blocks and the like very easily and economically with the fastener halves being merely inserted into holes drilled into the blocks.

Other objects and advantages of the invention will become apparent from the following description read in conjunction with the attached drawings in which.

2

Figure 1:
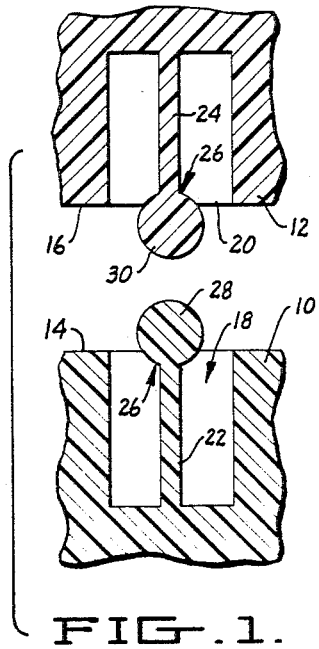
FIG. 1 is a sectional view through a pair of bodies provided with the snap fastener half portions of this invention.

Referring now in detail to the drawings and particularly to FIG. 1, two bodies 10 and 12 have flat face portions 14 and 16 respectively in which are provided cylindrical recesses 18 and 20 respectively which extend generally perpendicular to the faces 14 and 16. A pair of resilient stems 22 and 24 are mounted on the bodies 10 and 12 respectively in the centers of the recesses 18 and 20, and each stem has a free end 26. A latch portion in the form of a frusto-spherical ball 28 and 30 is mounted on the free end 26 of each of the stems 22 and 24 respectively with the diameter of the ball being greater than the diameter of the stem and approximately equal to one-half of the diameter of the recesses 18 and 20.

As illustrated in FIG. 1, the latch portions 28 and 30 protrude from the recesses 18 and 20 respectively outwardly from the body faces 14 and 16 by a distance which is greater than the radius of the ball and less than the ball's diameter.

Figure 2:
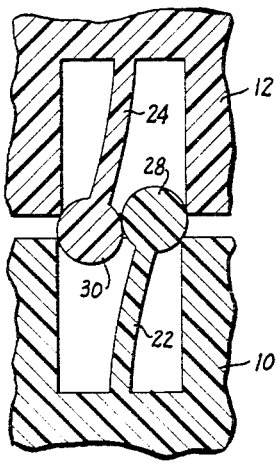
FIGS. 2 and 3 are sectional views of the bodies of FIG. 1 illustrating two steps in the progressive fastening of the two bodies together.
Figure 3:
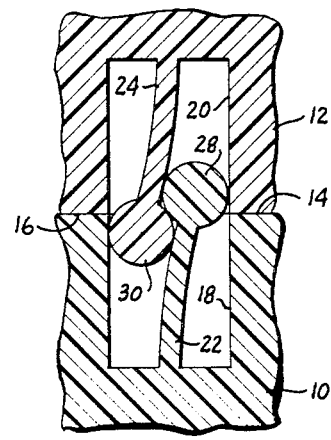

When it is desirable to fasten the bodies 10 and 12 together, the bodies 10 and 12 are pressed toward each other as sequentially illustrated in FIGS. 2 and 3 until the body faces 14 and 16 are in engagement with each other. During this progressive movement, the outer surfaces of the balls 28 and 30 first engage each other and cause the stems 22 and 24 to bend to permit the ball on each of the bodies 10 and 12 to enter the recess in the other body 12 or 10 respectively, and as the body faces 14 and 16 finally come into engagement, each of the balls comes into latching engagement between the other ball and the wall surfaces of the recess in which the other ball is mounted. Thus, as illustrated in FIG. 3, the ball 28 is in latching engagement between the ball 30 and the cylindrical wall of the recess 20, and the ball 30 is in latching engagement between the ball 28 and the cylindrical wall of the recess 18. When it is desirable to separate the two bodies 10 and 12, they are merely pulled apart, and the balls slip out of latching engagement. In this regard, latching and unlatching of the two bodies is facilitated by the resiliency of the walls of the bodies 10 and 12, the material in the balls themselves, and the material in the stems 22 and 24.

Figure 4:
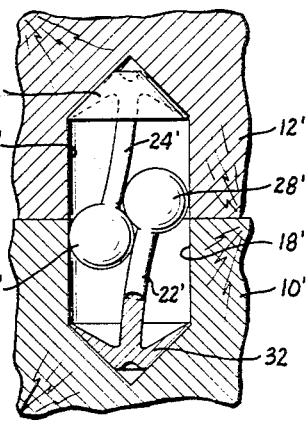
FIGS. 4 and 5 are sectional views similar to FIG. 3 illustrating two alternative forms of snap fasteners of this invention.

In the modified form of snap fastener illustrated in FIG. 4, the structure and arrangement of the snap fastener components are very similar to those shown in FIG. 1, but a different mounting arrangement is provided for supporting the stems 22' and 24' in the bodies 10' and 12'. The form of snap fastener shown in FIG. 4 is particularly useful where the bodies 10' and 12' may be made of different materials than the latch portions 28' and 30'. Thus, the bodies may be made of wooden blocks while the stems and latch portions may be made of metal or plastic. In this form of the snap fastener, a frustoconical locking portion 32 is provided on the inner end of each of the stems 22' and 24' where the locking portion has a maximum unstressed diameter greater than the diameter of the cylindrical recess 18 or 20 in which it is mounted. Thus, the recess is illustrated as having a cylindrical shape with a conical bottom, this being the shape of the recess provided by drilling the recess into the body, and the stem 22' and latch portion 28' are attached to the body 10' merely by forcing the conical locking portion 32 into the recess 18' until the locking portion 32 engages the bottom of the recess. During this insertion, the conical locking portion is resiliently flexed and holds the stem 22 and ball 28 in the recess.

Figure 5:
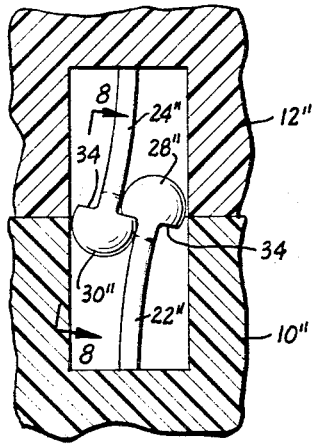
Figure 8:
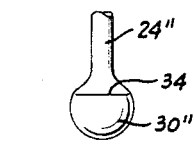
FIG. 8 is a side view of one of the elements taken along lines 8—8 in FIG. 5.

The latching force by which the latch portions on the two snap fastener halves hold the bodies together can be controlled by selecting different shapes for the latch portions of the snap fastener halves. Thus, the modified form of snap fastener illustrated in FIG. 5 is similar to that shown in FIGS. 1–3 except that a flat surface 34 has been provided on the inwardly facing side of each of the balls 28″ and 30″. The frusto-spherical surface of the ball extends through a solid angle exceeding 180 degrees with the flat surface 34 on each ball subtending an angle at the center of the ball which is less than 180 degrees. When the snap fastener shown in FIG. 5 is employed in lieu of the snap fastener of FIG. 3, greater forces are required to separate the bodies 10″ and 12″ from each other, and obviously this unlatching force can be controlled by selection of other shapes for the latch portions 28 and stems 22. In this regard, the stem 22″ and 24″ in FIG. 5 have tapered outer surfaces in one axial plane, as indicated in FIG. 8 so that the fastener has increased latching forces, but the latching forces may be reduced by rotating the two bodies 10″ and 12″ during unlatching.

Figure 6:
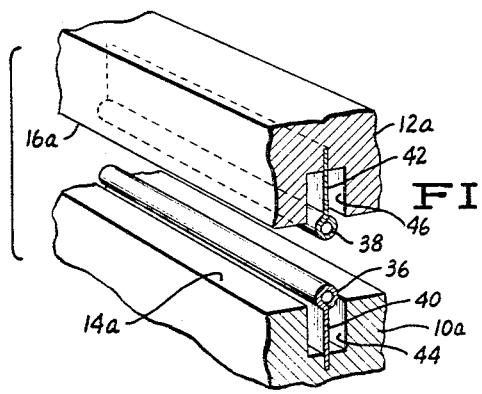
FIG. 6 is a perspective view of a pair of bodies in which another alternative form of snap fastener of this invention is employed where this form of the snap fastener is useable with the forms shown in FIGS. 3–5.

The snap fastener illustrated in FIG. 6, is somewhat similar to that shown in FIGS. 1–3 except that the latch portions 28 and 30 which are spheres in FIGS. 1–3 are replaced by latch portions 36 and 38 in FIG. 6 which have the shapes of cylinders parallel to the adjacent faces 14A and 16A of the bodies 10A and 12A. With this modification of the latch portions to provide cylindrical latch portions, the stems 40 and 42 on the latch portions 36 and 38 respectively have the shapes of elongated flat plates, and the recesses 44 and 46 in which the stems 40 and 42 respectively are mounted have the shapes of elongated slots with opposite parallel side walls. A cross section through one of the bodies 10A and 12A, however, is substantially identical to the cross sectional drawings shown in FIGS. 1–3 with the cylindrical latch portions 36 and 38 positioned in substantially the same way as the spherical latch portions 28 and 30 in FIG. 1. The snap fastener of FIG. 6 is useful for attaching together elongated objects and is additionally useful as a base on which a plurality of bodies 12 of FIG. 1 may be fastened. In this latter regard it will be noted that either of the body members 10A and 12A may receive a plurality of toy building blocks for instance mounted at random positions along the length of the body 10A.

Figure 7:
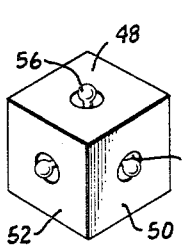
FIG. 7 is a perspective view of a toy building block incorporating the snap fasteners of this invention.

FIG. 7 shows a toy building block in which three of its faces 48, 50 and 52 are visible, and a recess 54 is provided in each of these faces with a ball shaped latch portion 56 provided in each of the recesses 54. The recesses 54 and 56 are constructed substantially as shown in FIG. 1 so that each face of the toy block shown in FIG. 7 can be attached to each one of the faces of an identical toy block.

While certain specific embodiments of this invention have been illustrated and described in detail herein, it is obvious that many modifications thereof may be made without departing from the spirit and scope of the invention.

I claim:

1. A snap-type fastener comprising a pair of separable bodies having body faces thereon in engagement with each other, a recess in said body face of each of said bodies, with said recesses communicating with each other and with each recess having opposite side wall portions extending away from the body face in which said recess is provided, a stem mounted on each of said bodies in the recess in the face of its respective body substantially midway between its respective side wall portions, and a latch portion on the free end of each of said stems and having a width greater than the width of said stem with the latch portion on each of said bodies positioned partially within the recess in its respective body and extending partially into the recess in the other body in latching engagement between the latch portion on said other body and one of the side wall portions of the recess in said other body with said latch portions having latch surface portions thereof in engagement with each other with said latch surface portion of each of said latch portions facing in a direction which has a component directed toward the bottom of the recess in which said latch portion is mounted.

2. A snap-type fastener comprising a pair of separable bodies having body faces thereon in engagement with each other, a recess in said body face of each of said bodies with the recesses in said faces communicating with each other, a stem mounted on each of said bodies at about the middle of the recess in the face of its respective body, and a latch portion on the free end of each of said stems with the latch portions on said stems having circular surface portions in a plane perpendicular to said body faces where the circular surface portion on each of said bodies has an arcuate length of at least 180 degrees and protrudes from a point within its respective recess and further protrudes beyond its respective body face by a distance which is greater than the radius of said circular surface portion, said latch portions on each of said bodies extending into the recess in the other body in latching engagement with the latch portion on said other body with said latch portions having latch surface portions thereof in engagement with each other with said latch surface portion of each of said latch portions facing in a direction which has a component directed toward the bottom of the recess in which said latch portion is mounted.

3. The fastener of claim 2 in which each of said latch portions has the general shape of a cylinder the axis of which lies parallel to said body surface of the body on which said latch portion is mounted, and said recess in each of said bodies has the general shape of an elongated groove in said body parallel to said axis with said groove having a width which is less than twice the cylinder diameter of said latch portion.

4. The fastener of claim 2 in which each of said latch portions has the general shape of a sphere, and said recess in each of said bodies has the general shape of a cylinder perpendicular to said body surface with a cylinder diameter equal to less than twice the sphere diameter of said latch portion.

5. The fastener of claim 4 in which a generally frusto-conical locking portion is mounted on said stem on the end of said stem opposite to said latch portion with said frusto-conical locking portion having a maximum diameter greater than the cylinder diameter of said recess and a cone apex facing away from said latch portion.

6. A toy building block adapted to be fastened to similar building blocks which comprises: a body having a plurality of exterior faces, a plurality of recesses in different faces of said body with each of said recesses having opposite parallel side wall portions generally perpendicular to the adjacent face of said body, a resilient stem mounted in each of said recesses midway between the walls of said recess and having a free end near the adjacent face of said body, and a latch portion on the free end of each of said stems with each of said latch portions positioned partially within said recess and extending partially out of said recess and with each of said latch portions having a width greater than said stem and about one half of the distance between said opposite wall portions of said recess whereby one of said latch portions on said block can be inserted in any one of the recesses in an identical block in latching engagement between the latch portion in said one recess and one of the side wall portions of said one recess each of said latch portions having latching surface portions thereon adjacent to the plane of the face of said body through which said latch portion extends with said latching surface portions facing at least in part toward the bottom of said recess in which said latch portion is mounted.

7. A toy building block adapted to be fastened to similar building blocks which comprises. a body having a plurality of exterior faces, a plurality of cylindrical recesses in said block with each of said recesses provided in a different one of said faces and extending into said block generally perpendicular to said face, a resilient stem mounted in each of said recesses in said block generally coaxial with said recess, and a frusto-spherical ball portion mounted on the outer end of each of said stems, said ball portion having a width greater than the width of said stem, with each of said ball portions having a frusto-spherical surface portion which subtends a solid angle greater than 180 degrees at the center of said ball and with said ball portion protruding from a location within said recess out of said recess and extending beyond said face by a distance which is greater than the radius of said ball portion and less than the diameter of said ball portion.

References Cited

UNITED STATES PATENTS

| 1,024,566 | 4/1912 | Gifford | 24—230 |
| 2,035,674 | 3/1936 | Sipe. | |
| 2,499,898 | 3/1950 | Anderson | 24—213 X |

FOREIGN PATENTS

| 1,176,188 | 11/1958 | France. |
| 778,558 | 7/1957 | Great Britain. |
| 1,156,688 | 10/1963 | Germany. |

E. BARRY SHAY, *Primary Examiner.*